United States Patent
Singhal et al.

(10) Patent No.: US 7,606,867 B1
(45) Date of Patent: Oct. 20, 2009

(54) ORDERED APPLICATION MESSAGE DELIVERY USING MULTIPLE PROCESSORS IN A NETWORK ELEMENT

(75) Inventors: Pravin Singhal, Cupertino, CA (US);
Luu Tran, Santa Clara, CA (US); Juzer Kothambawala, Cupertino, CA (US);
Anoop Agarwal, Sunnyvale, CA (US);
Vijay Raghavan, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 662 days.

(21) Appl. No.: 11/471,465

(22) Filed: Jun. 19, 2006

Related U.S. Application Data

(60) Provisional application No. 60/692,715, filed on Jun. 21, 2005.

(51) Int. Cl.
*G06F 15/16* (2006.01)
*G06F 15/173* (2006.01)
*G06F 15/76* (2006.01)

(52) U.S. Cl. .................. 709/209; 709/238; 712/31
(58) Field of Classification Search .............. 709/209, 709/238; 712/31
See application file for complete search history.

(56) References Cited

U.S. PATENT DOCUMENTS

| | | | |
|---|---|---|---|
| 6,115,378 A | 9/2000 | Hendel et al. | |
| 6,772,211 B2 | 8/2004 | Lu et al. | |
| 7,032,031 B2* | 4/2006 | Jungck et al. | 709/246 |
| 7,114,008 B2* | 9/2006 | Jungck et al. | 709/246 |
| 7,185,365 B2 | 2/2007 | Tang et al. | |
| 7,245,620 B2 | 7/2007 | Shankar | |
| 7,330,908 B2* | 2/2008 | Jungck | 709/246 |
| 2002/0107951 A1 | 8/2002 | Teague et al. | |
| 2002/0114274 A1 | 8/2002 | Sturges et al. | |

(Continued)

FOREIGN PATENT DOCUMENTS

WO  WO 03/021465 A1  3/2003

OTHER PUBLICATIONS

International Searching Authority, "Notification of Transmittal of the International Search Report and the Written Opinion of the International Searching Authority, or the Declaration," PCT/US2006/024375, dated Oct. 17, 2006, 10 pages.

(Continued)

*Primary Examiner*—George C Neurauter, Jr.
(74) *Attorney, Agent, or Firm*—Hickman Palermo Truong & Becker LLP

(57) ABSTRACT

A data processing apparatus comprises a plurality of processors and message processing logic operable for establishing one of the processors as a master processor and all other processors as slave processors; receiving an application message from a particular message source among a plurality of message sources coupled to one or more network interfaces and the processors, wherein the application message comprises one or more data frames, packets and segments; granting exclusive control of the particular message source to a selected one of the slave processors; assigning an ordered sequence number to the application message; granting exclusive control, for a particular message destination among a plurality of message destinations coupled to the network interfaces and the processors, to the selected one of the slave processors; and providing the application message to the particular message destination.

36 Claims, 9 Drawing Sheets

U.S. PATENT DOCUMENTS

| | | |
|---|---|---|
| 2002/0143981 A1 | 10/2002 | DeLima et al. |
| 2002/0163933 A1 | 11/2002 | Benveniste |
| 2002/0191622 A1 | 12/2002 | Zdan |
| 2003/0005117 A1 | 1/2003 | Kang et al. |
| 2003/0018726 A1 | 1/2003 | Low et al. |
| 2003/0036897 A1 | 2/2003 | Flores et al. |
| 2003/0112809 A1 | 6/2003 | Bharali et al. |
| 2003/0217171 A1 | 11/2003 | Von Stuermer et al. |
| 2004/0039940 A1 | 2/2004 | Cox et al. |
| 2004/0162871 A1 | 8/2004 | Pabla et al. |
| 2004/0205336 A1 | 10/2004 | Kessler et al. |
| 2004/0267920 A1 | 12/2004 | Hydrie et al. |
| 2004/0267933 A1 | 12/2004 | Przybylski et al. |
| 2005/0050362 A1 | 3/2005 | Peles |
| 2005/0213591 A1 | 9/2005 | Nakazawa et al. |

OTHER PUBLICATIONS

Current Claims, PCT/US2006/024375, 6 pages.

Decasper, Dan et al., "Router Plugins: A Software Architecture for Next-Generation Routers," IEEE ACM Transactions on Networking, vol. 9, No. 1, Feb. 2000, XP011038838, 14 pages.

International Searching Authority, "Notification of Transmittal of the International Search Report and the Written Opinion of the International Searching Authority, or the Declaration", International application No. PCT/US05/46149, dated Jul. 20, 2007, 9 pages.

Claims, International application No. PCT/US05/46149, 10 pages.

* cited by examiner

ORDERED APPLICATION MESSAGE DELIVERY USING MULTIPLE PROCESSORS IN A NETWORK ELEMENT

PRIORITY CLAIM

This application claims the benefit under 35 U.S.C. 119(e) of prior provisional Application No. 60/692,715, filed Jun. 21, 2005, the entire contents of which are hereby incorporated by reference for all purposes as if fully set forth herein.

CROSS-REFERENCE TO RELATED APPLICATIONS

This application is related to prior U.S. patent application Ser. No. 11/043,857, filed Jan. 25, 2005, entitled "APPLICATION LAYER MESSAGE-BASED SERVER FAILOVER MANAGEMENT BY A NETWORK ELEMENT," by Sunil Potti et al.; U.S. patent application Ser. No. 10/991,792, entitled "PERFORMING MESSAGE AND TRANSFORMATION ADAPTER FUNCTIONS IN A NETWORK ELEMENT ON BEHALF OF AN APPLICATION", by Pravin Singhal et al., filed on Nov. 17, 2004; U.S. patent application Ser. No. 10/997,616, entitled "CACHING CONTENT AND STATE DATA AT A NETWORK ELEMENT", by Alex Yiu-Man Chan et al., filed on Nov. 23, 2004; U.S. patent application Ser. No. 11/005,978, entitled "PERFORMING MESSAGE PAYLOAD PROCESSING FUNCTIONS IN A NETWORK ELEMENT ON BEHALF OF AN APPLICATION", by Tefcros Anthias et al., filed on Dec. 6, 2004; U.S. patent application Ser. No. 11/007,421, entitled "PERFORMING SECURITY FUNCTIONS ON A MESSAGE PAYLOAD IN A NETWORK ELEMENT", by Sandeep Kumar et al., filed on Dec. 7, 2004; U.S. patent application Ser. No. 11/007,152, entitled "NETWORK AND APPLICATION ATTACK PROTECTION BASED ON APPLICATION LAYER MESSAGE INSPECTION", by Sandeep Kumar et al., filed on Dec. 7, 2004; U.S. patent application Ser. No. 11/009,127, entitled "REDUCING THE SIZES OF APPLICATION LAYER MESSAGES IN A NETWORK ELEMENT", by Ricky Ho et al., filed on Dec. 10, 2004; U.S. patent application Ser. No. 11/009,270, entitled "GUARANTEED DELIVERY OF APPLICATION LAYER MESSAGES BY A NETWORK ELEMENT", by Tefcros Anthias et al., filed on Dec. 10, 2004; U.S. patent application Ser. No. 11/031,106, filed Jan. 5, 2005, entitled "INTERPRETING AN APPLICATION MESSAGE AT A NETWORK ELEMENT USING SAMPLING AND HEURISTICS," by Tefcros Anthias et al., filed on Jan. 5, 2005, and U.S. patent application Ser. No. 11/031,184, filed on Jan. 6, 2005, entitled "DATA TRAFFIC LOAD BALANCING BASED ON APPLICATION LAYER MESSAGES," by Hari Kathi et al., filed on Jan. 6, 2005, the entire contents of which are hereby incorporated by reference for all purposes as if fully set forth herein.

FIELD OF THE INVENTION

The present invention generally relates to data processing in network elements such as routers and switches. The invention relates more specifically to techniques for ordered message delivery in a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

For scalability reasons, a network element that processes application messages may be deployed with multiple processors or blades that are grouped together into a single virtual cluster. Administrators and application programmers interact with the multiple blades as a single node for processing application messages. Each blade in the virtual cluster has the same processing logic and receives the same configuration, enabling an administrator to manage the virtual cluster as if managing a single blade. The blades may be physically distributed without direct hardware interconnects, and may communicate using a logical network mechanism.

An Application Oriented Network (AON) element may consume messages from an ordered source. A messaging queue is one example of an ordered source. The network element may perform application level functions, which are computationally expensive, on the message on behalf of a client. The cost of consuming the messages from the ordered source typically is low compared to the cost of processing the messages in the network element, and therefore a network element can increase processing capacity efficiently by using a virtual cluster of blades.

In such a configuration, the blades in the virtual cluster can consume and process messages in parallel. When a messaging source requires ordered delivery of its messages, the blades in a virtual cluster must ensure that the messages are consumed from the source in the same ordered sequence. Failure to ensure ordered delivery could cause errors at the receiver of the messages.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
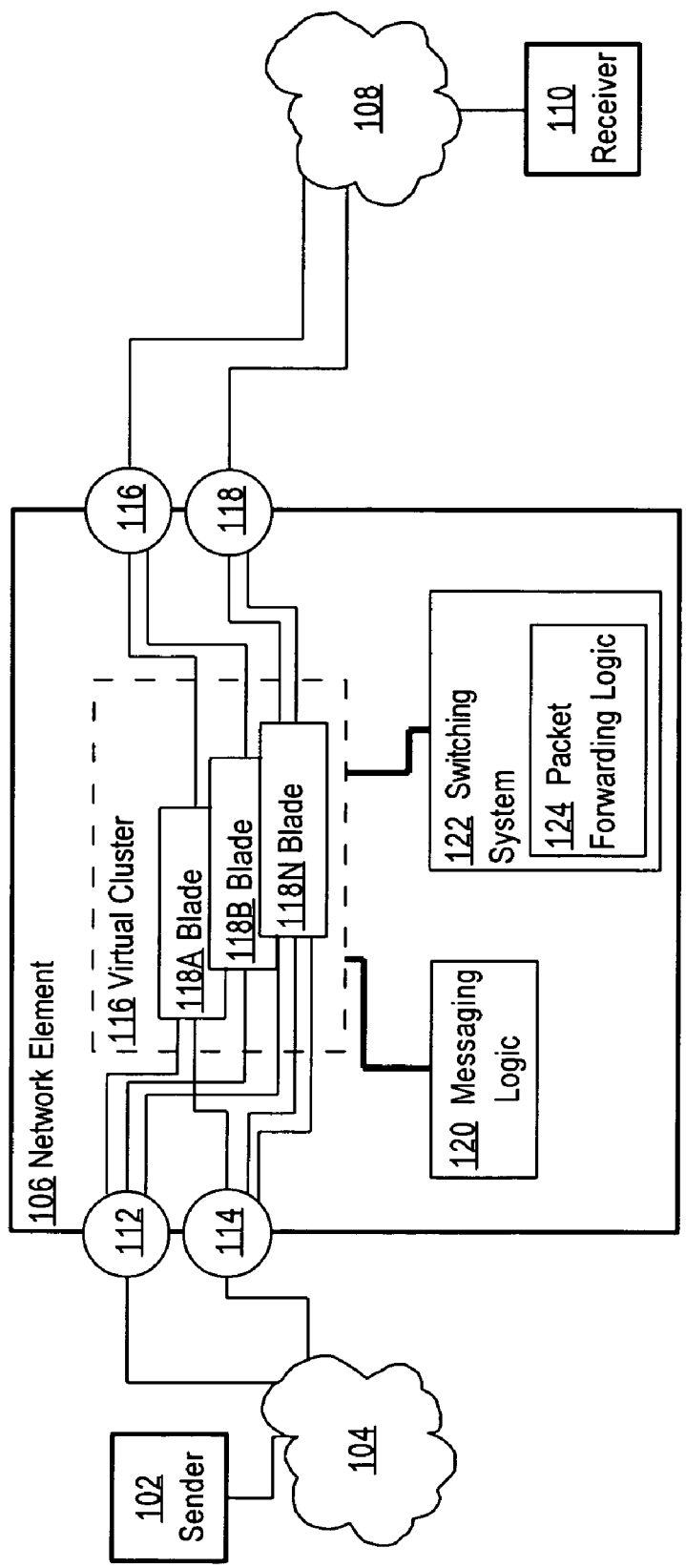
FIG. 1 is a block diagram showing a high-level view of an example internal arrangement for a network element.

A multiprocessor network element that provides ordered message delivery is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Functional and Structural Overview
3.0 Example Embodiment
   3.1 Blade Structure
   3.2 Processing Inbound Messages
   3.3 Processing Outbound Messages
   3.4 Initialization
   3.5 Rebalancing
   3.6 Failover
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a data processing apparatus comprises a plurality of processors and message processing logic which when executed by the processors is operable to perform establishing one of the processors as a master processor and all other processors as slave processors; receiving an application message from a particular message source among a plurality of message sources coupled to one or more network interfaces and the processors, wherein the application message comprises one or more data frames, packets and segments; granting exclusive control of the particular message source to a selected one of the slave processors; assigning an ordered sequence number to the application message; granting exclusive control, for a particular message destination among a plurality of message destinations coupled to the network interfaces and the processors, to the selected one of the slave processors; and providing the application message to the particular message destination.

In one feature, establishing one of the processors as a master processor and all other processors as slave processors is performed using Web Cache Control Protocol (WCCP).

In another feature, the selected one of the slave processors yields exclusive control of the particular message source to the master processor after processing a specified plurality of messages. In still another feature, the selected one of the slave processors yields exclusive control of the particular message source to the master processor after processing a specified time period.

According to another feature, the message processing logic further comprises logic which when executed by the processors is operable to perform persistently storing information identifying the assigned ordered sequence number of the application message; determining that the selected one of the slave processors has failed; selecting a different one of the slave processors; granting exclusive control of the particular message source to the selected different one of the slave processors; retrieving, at the selected different one of the slave processors, the stored information identifying the assigned ordered sequence number of the application message; receiving a new application message; assigning a new sequence number to the new application message by increasing the assigned ordered sequence number that was retrieved.

In yet another feature, the message processing logic further comprises logic which when executed by the processors is operable to perform persistently storing information identifying which selected one of the slave processors has been granted exclusive control of the particular message source; determining that the master processor has failed; establishing a different one of the processors as a new master processor; retrieving, at the new master processor, the stored information identifying which selected one of the slave processors has been granted exclusive control of the particular message source.

In a further feature, the message processing logic further comprises logic which when executed by the processors is operable to perform receiving the application message and its sequence number from the selected one of the slave processors; determining whether the sequence number is next in order after a previous sequence number of a previously sent message; providing the application message to the particular message destination only when the sequence number is ordered sequentially after a previous sequence number of a previously sent message.

In still another feature, the message processing logic further comprises logic which when executed by the processors is operable to perform, at the master processor receiving a first application message and a first sequence number from a first one of the slave processors that has processed messages for a particular message source; receiving a second application message and a second sequence number from a second one of the slave processors that has processed messages for the same particular message source; determining whether the first sequence number is next in order after a previous sequence number of a previously sent message; providing the first application message to the particular message destination if the first sequence number is next in order after the previous sequence number of the previously sent message, and otherwise: determining whether the second sequence number is next in order after the previous sequence number of the previously sent message; providing the second application message to the particular message destination when the second sequence number is next in order after the previous sequence number of the previously sent message.

In yet another feature, the message processing logic further comprises logic which when executed by the processors is operable to perform, at the master processor receiving a first request for exclusive access to the particular message destination, a first application message and a first sequence number from a first one of the slave processors that has processed messages for a particular message source; receiving a second request for exclusive access to the particular message destination, a second application message and a second sequence number from a second one of the slave processors that has processed messages for the same particular message source; determining whether the first sequence number is next in order after a previous sequence number of a previously sent message; granting exclusive control of the particular message destination to the first one of the slave processors only when the first sequence number is next in order after a previous sequence number of a previously sent message.

In yet another feature, the message processing logic further comprises logic which when executed by the processors is operable to perform in response to providing the application message to the particular message destination, persistently storing information identifying the assigned ordered sequence number of the application message in association with information identifying the particular message destination; receiving a request for exclusive access to the particular message destination, a new application message and its sequence number from the selected one of the slave processors; retrieving the persistently stored information identifying the assigned ordered sequence number of the application message for the particular message destination; determining whether the sequence number is next in order after the retrieved sequence number; providing the application message to the particular message destination only when the sequence number is next in order after the retrieved sequence number.

In various embodiments, the apparatus comprises any of a router for a packet data network and a switch for a packet data network.

In an embodiment, the apparatus comprises a switching system coupled to the processors and comprising packet forwarding logic, wherein the switching system and packet forwarding logic are configured to receive packets on a first network interface, determine a second network interface on which to send the packets, and to send the packets on the second network interface.

In yet another feature the application message is of OSI Layer 4, 5, or 6 and comprises one or more data frames, packets and segments of OSI Layer 1, 2 and 3.

In other aspects, the invention encompasses a method and a computer-readable medium configured to carry out the foregoing steps.

2.0 Functional and Structural Overview

According to an embodiment, a network element receives and delivers messages using multiple data processing blades in parallel. When a message requires ordered delivery, the blades in a virtual cluster that receive the messages ensure that the messages are delivered in the correct order according to novel approaches disclosed herein. Whereas past approaches to similar problems typically resort to single entry and exit points, the approach herein uses multiple entry points and exit points that permit an embodiment to parallelize the processing of application messages. As a result, scalability is achieved, so that a network element may have many blades to process large numbers of messages, while still providing ordered delivery of messages.

In an embodiment, data processing blades in a virtual cluster become organized into a master-slave relationship, in which one blade is elected a master blade, and all other blades are slave blades. As blades join or leave the virtual cluster, the master election process is repeated. Each slave blade can take over as master blade at any time, and each master blade can relinquish the role of master and become a slave blade. In one embodiment, Cisco Web Cache Communication Protocol (WCCP) is the mechanism for electing the master blade and detecting when blades join or leave, but other embodiments may use other master-slave protocols or election protocols. In an embodiment, a blade or processor having the lowest network address or IP address is elected as master.

For processing received or inbound messages, embodiments use the following general approach. The master blade coordinates with the slave blades to ensure that messages from ordered data sources are consumed, load-balanced and assigned sequence numbers. The master blade assigns the ordered data sources to one slave blade at a time. The slave blades periodically yield the assigned sources back to the master for reassignment. In one embodiment, the master blade persistently stores the state of assignments of sources to blades in a registry or database. Therefore, if the master blade fails, the slave blade can take over by reading the database.

In an embodiment, the master and slave blades communicate source assignments by passing Source Tokens to each other. In an embodiment, tokens are passed in control messages that are transported over TCP connections that are persistently established between the blades.

Each blade comprises logic that permits the blade to consume or deliver messages only when the blade holds a source token or destination token, respectively. In this approach, if a first blade receives a Source Token, no other blade can consume messages from the data source referenced in the Source Token.

Once a blade in a virtual cluster receives the Source Token, that blade starts to consume messages from the assigned data sources. Sequence numbers are assigned to each message to maintain ordering as the messages are distributed through the network. In one embodiment, each blade persistently stores the sequence number that should be assigned to the next message consumed from a particular source in a database to allow the next blade assigned to the source to pick up where the previous blade left off.

Accordingly, in an embodiment, processing blades in a virtual cluster self-organize into a master-slave relationship and coordinate source and sequence number assignments to maintain ordering of messages consumed from sources. Ordered message consumption in the virtual cluster continues in the face of failures or reconfigurations of individual blades in the cluster. Ordered message delivery behaves differently depending on the reliability semantics of the messages. Inter-blade communication is minimized to ensure that network bandwidth is maximized for the distribution and delivery of application messages. Performance is optimized by maximizing parallelism on slave blades and minimizing the sequential operations of the master blade.

FIG. 1 is a block diagram showing a high-level view of an example internal arrangement for a network element in the context of a network. Generally, a sender 102 is coupled directly or indirectly through a first network 104 to a network element 106, which is coupled directly or indirectly through a second network 108 to a receiver 110. Sender 102 and receiver 110 may comprise network infrastructure elements such as router and switches, or network end station elements such as personal computers, workstations, printers, mobile devices, etc.

Network element 106 typically comprises an infrastructure element such as a router or switch for a packet-switched network. In one embodiment, network element 106 is a Catalyst 6000 Series Switch or model 3745 router from Cisco Systems, Inc., San Jose, Calif. For purposes of illustrating a clear example, FIG. 1 shows one each of the sender 102, first network 104, network element 106, second network 108, and receiver 110, but in various embodiments there may be any number of such elements.

Network element 106 comprises one or more inbound interfaces 112, 114 and one or more outbound interfaces 116, 118. A virtual cluster 116 comprises one or more processing blades 118A, 118B, 118N. For purposes of illustrating a clear example, FIG. 1 shows limited numbers of interfaces, virtual clusters, and blades, but in various embodiments there may be any number of such elements. Each of blades 118A, 118B, 118N comprises a processor, memory, and one or more stored application programs that execute on the blades. Typically all the blades run the same software to implement the same features and functions. In an embodiment, each of the blades comprises an Application-Oriented Networking (AON) blade from Cisco Systems.

Virtual cluster 116 is coupled to messaging logic 120 and a switching system 122, which comprises packet forwarding logic 124.

Messaging logic 120 comprises logic, one or more computer programs, or any other suitable combination of hardware, firmware or software that can implement the functions described herein in connection with the other drawing figures, in cooperation with the virtual cluster and blades.

Switching system 122 comprises a switch matrix or fabric that can determine, for inbound packets arriving on interfaces 112, 114, which of the outbound interfaces 116, 118 to send the packets on, and can route the packets to the selected interfaces. Switching system 122 may perform packet protocol conversion, routing and forwarding at OSI Layer 2 or Layer 3.

3.0 Description of Example Embodiment

3.1 Blade Structure

Figure 2:
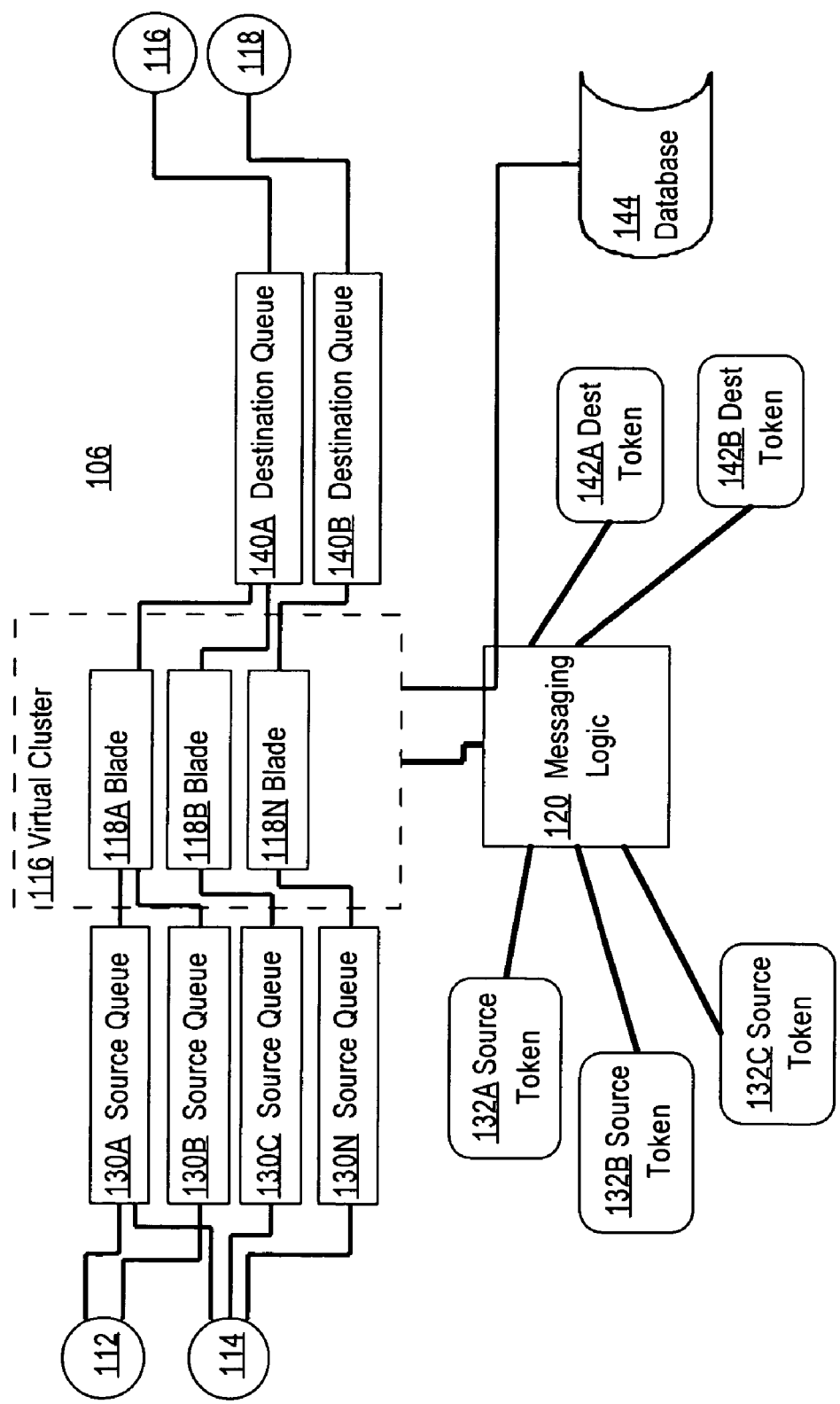
FIG. 2 is a more detailed view of certain elements of FIG. 2 involved in an example embodiment of ordered message processing.

FIG. 2 is a more detailed view of certain elements of FIG. 1 involved in an example embodiment of ordered message processing.

Network element 106 further comprises a plurality of ordered message queues. In one embodiment, the network element 106 comprises a plurality of source queues 130A, 130B, 130C, 130N coupled from interfaces 112, 114 to blades 118A, 118B, 118N of virtual cluster 116. In practice, all of the source queues are coupled to all of the interfaces and blades, but for clarity in FIG. 2 not all such connections are shown.

Each of the source queues 130A-130N is uniquely associated with a particular message source. Examples of message sources are IBM MQ, EMS from TIBCO, HTTP, one or more connections in sets that interoperate with an ordering abstraction layer, etc. Other message sources may comprise FTP servers or other systems. Embodiments are operable with any message source in which some form of message ordering has been defined. The messaging queues are used to buffer, receive and send ordered application-layer messages. The messaging queues may be established and managed by external or third-party application software that is hosted on network element 106.

In an embodiment, only one source queue per message source is required, and embodiments allow processing a large number of messages arriving from a message source with a single queue, so that multiple queues are not required. However, in an alternate embodiment there may be more than one source queue per message source.

In an embodiment, network element 106 further comprises a plurality of destination queues 140A, 140B that are similarly coupled to all of the blades and to the output interfaces 116, 118. Each of the destination queues 140A-140N is uniquely associated with a particular message destination. Destinations may comprise MQ servers, FTP servers, or other systems that receive data from network element 106. In an embodiment, only one destination queue per message destination is required, and embodiments allow processing a large number of messages arriving from a message destination with a single queue, so that multiple queues are not required. However, in an alternate embodiment there may be more than one destination queue per message destination.

Messaging logic 120 comprises a plurality of source tokens 132A, 132B, 132C corresponding to the source queues 130A, 130B, 130C, etc. Messaging logic comprises a plurality of destination tokens 142A, 142B respectively corresponding to destination queues 140A, 140B. As further described below, messaging logic 120 can control ordered message flow in the network element 106 by selectively granting a token to one and only one of the queues.

Network element 106 further comprises a stored information repository such as database 144 that messaging logic 120 manages for storing information about token granting operations and the sequence numbers that are assigned to ordered application messages. A set of tables in database 144 may comprise a registry for supporting the functions described herein.

3.2 Processing Inbound Messages

Figure 3:
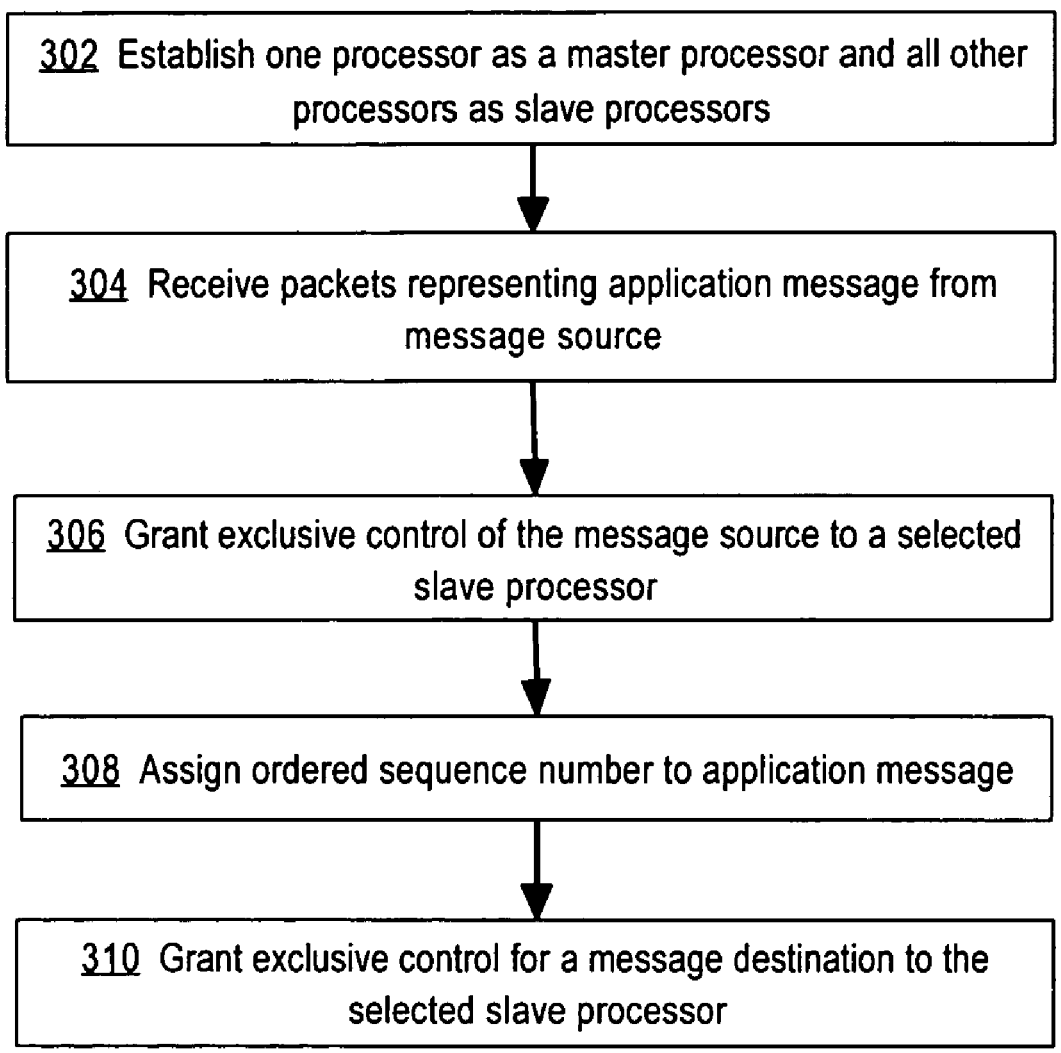
FIG. 3 is a flow diagram giving a high-level view of ordered application message delivery.

FIG. 3 is a flow diagram giving a high-level view of ordered application message delivery in one embodiment. Messaging logic 120, in cooperation with virtual cluster 116 and its blades, and in cooperation with the queues, may implement FIG. 3 in logic or software.

In step 302, one processor is established as a master processor and all other processors are established as slave processors. For example, blade 118A is established as a master processor of virtual cluster 116 and blades 118B, 118N are slave processors. In an embodiment, Cisco Web Cache Communication Protocol (WCCP) is used to elect a master processor. The packet redirection features of WCCP can provide high availability and load balancing. WCCP also can be used to retrieve information about virtual nodes, including when the virtual node configuration changes, which blades are members of the virtual node, and which blade is the designated node.

In step 304, packets representing an application message are received from a message source. For example, the application message is of OSI Layer 4, 5, or 6 and one or more data frames, packets and segments of OSI Layer 1, 2 and 3 are received and assembled into the application message. Messaging logic coupled to a virtual cluster of processing blades receives the assembled message. The message may enter an inbound source message queue and queue logic may notify the messaging logic that a message arrived.

In step 306, exclusive control of the message source is granted to a selected slave processor. For example, assume that a particular application message arrives in source queue 130A; the messaging logic assigns exclusive control of source queue 130A to blade 118A or any other available blade that the messaging logic selects.

In step 308, an ordered sequence number is assigned to the application message. In an embodiment, the messaging logic determines the next ordered sequence number to assign to a message of the particular message source and assigns the number to the message.

In step 310 exclusive control for a message destination is granted to the same selected slave processor. In an embodiment, the messaging logic 120 examines the received application message, determines a destination of the message, and selects one of the destination queues 140A, 140B that handles the destination. Messaging logic 120 may maintain a mapping of destinations to queues for this purpose. The messaging logic 120 then assigns exclusive control of the selected destination queue to blade 118A.

Figure 4:
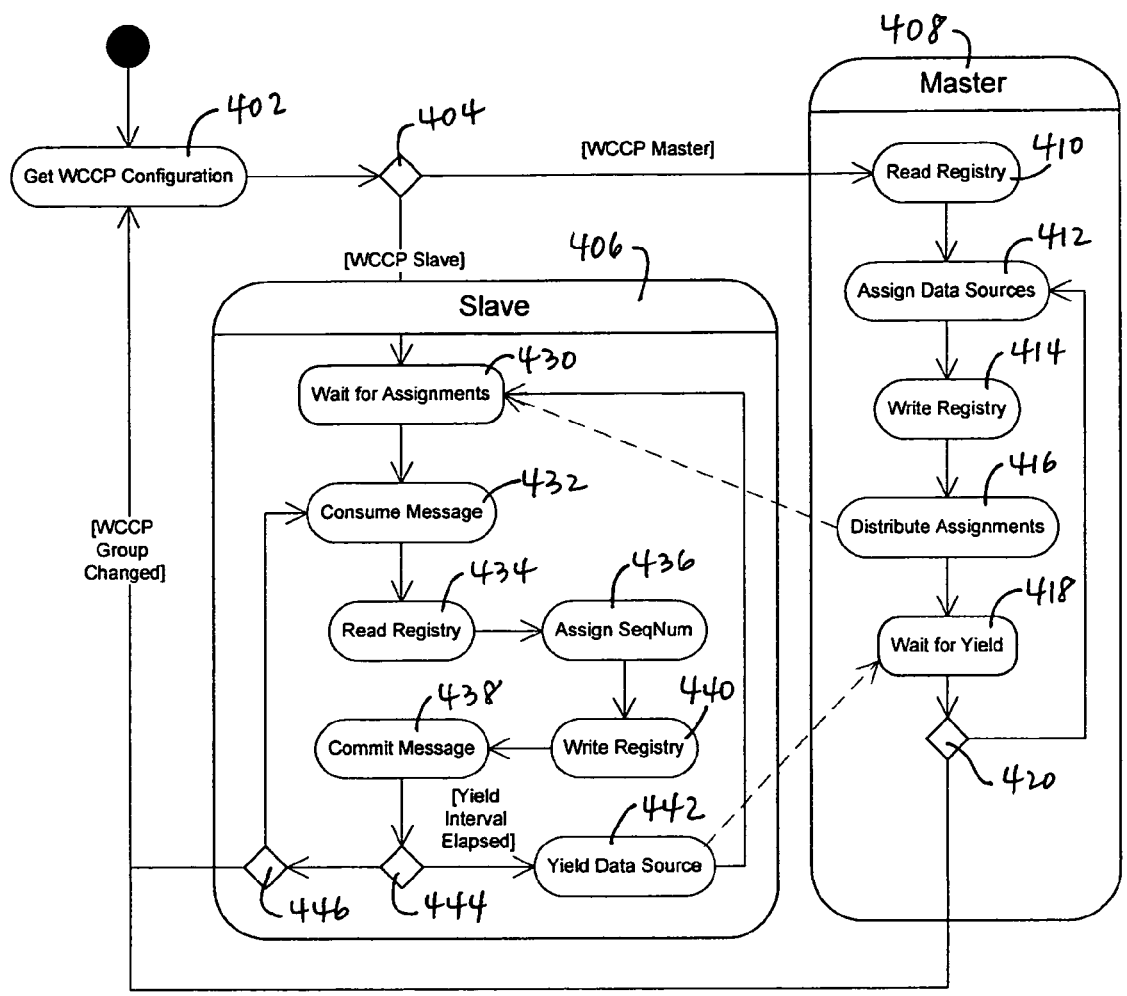
FIG. 4 is a flow diagram showing message consumption and commitment using a slave processor and master processor.

FIG. 4 is a flow diagram showing message consumption and commitment using a slave processor and master processor. Upon entry to FIG. 4 the role of a processor is unassigned. In step 402, a processor retrieves a current WCCP configuration setting. In step 404, the processor determines whether the current WCCP configuration establishes the processor as a master or slave. Steps performed for a master processor configuration are shown at box 408 and steps for a slave processor configuration are shown at box 406.

Referring first to box 408, in step 410 the master processor reads a registry such as database 144 of FIG. 2. At step 412 the master processor assigns all data sources that are identified in the registry to slave processors. For example, source queues 130A-130N of FIG. 2 are assigned to blades 118A-118N that are acting as slave processors. In step 414 the master processor writes source assignment information to the registry so that the source assignment information is available to another blade that may become the master processor in a failover scenario.

In step 416 the master processor distributes the assignments of the data sources to the slave processors by using TCP control messages, an inter-processor messaging protocol or other signaling mechanism. The master processor then allows the slave processors to consume or process messages from the data sources and waits for one of the slave processors to yield control of a source to the master processor, as indicated at step 418.

When a data source is yielded to the master processor, then at step 420 the master processor tests whether its group membership in a WCCP group has changed. If a change is detected, then control returns to step 402 to retrieve the new WCCP configuration and determine the processor's role. If no change occurred, then control returns to step 412 so that the recently yielded data source may be reassigned to another slave processor.

Referring now to box 406, if step 404 determines that the processor is a slave, then in step 430 the slave processor waits for one or more assignments of data sources. When a data source assignment is received at step 430, then in step 432 the slave processor consumes a message from a data source. At step 434, the slave processor reads the registry to identify the highest sequence number that has been assigned to a message from the data source. Based on the value obtained from the registry, at step 436 the slave processor assigns a sequence number to the message consumed at step 432. In an embodiment, the sequence number read from the registry is incremented.

At step 440, the slave processor writes the new sequence number to the registry. In step 438, the slave processor commits the message. In this context, to "commit" a message means to perform a finalized or completed database transaction for a mapping of the sequence number and message identifier. The use of database transactions and a commit approach ensures that a particular sequence number is not assigned to a different message if a slave processor crashes during processing FIG. 4.

In step 444 the slave processor tests whether a yield interval value for the data source has elapsed. The yield interval value specifies a time period after which the slave processor must yield control of the data source. Thus, each data source can have multiple slave processor consumers at different points in time. In an embodiment, slave processors periodically yield control of a data source by discontinuing consumption of messages and then notifying the MDS Manager (FIG. 5) which sends a Source Token message back to the master processor. The yield interval may be based on the number of messages consumed or time elapsed or both.

When the yield interval is based on the number of messages consumed, each slave processor tracks of the number of messages the slave processor has consumed from each data source. Once this number reaches a configurable threshold, the slave processor stops consuming messages and yields control of the data source. When the yield interval is based on elapsed time, each slave processor tracks the timestamp at which the slave processor begins consuming messages from a data source. The slave processor checks the current system time before the slave processor consumes each subsequent message. Once a configurable time interval has elapsed, the slave processor stops consuming messages and yields control of the data source.

If the yield interval has elapsed, then in step 442 the slave processor yields control of the data source by communicating to the master processor, and control returns to step 430 at which the slave processor awaits another assignment.

Figure 5:
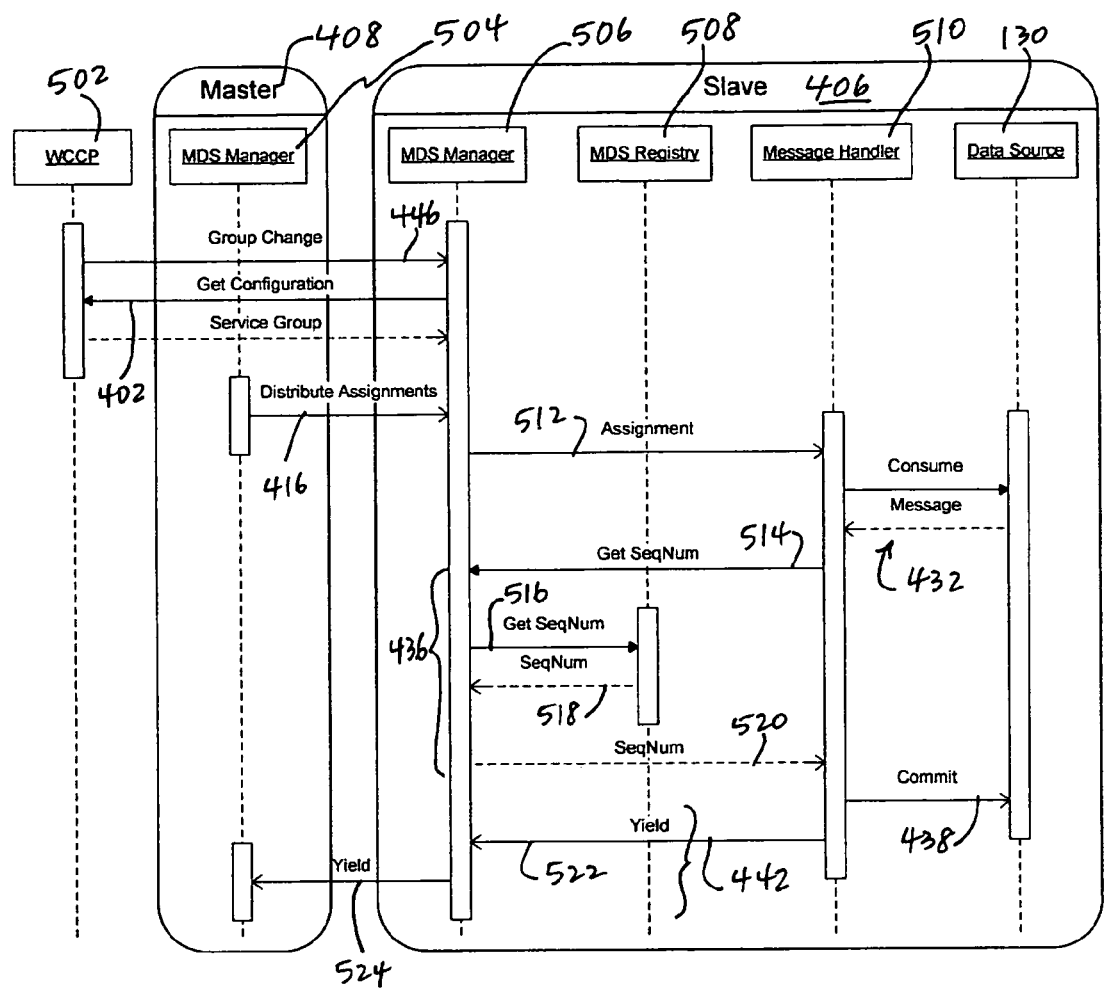
FIG. 5 is a message ladder diagram showing interaction of a master processor and slave processor for message consumption according to another embodiment.

If the yield interval has not elapsed as tested at step 444 then at step 446 the slave processor tests whether its WCCP group membership has changed. Group membership may change, for example, when a processor is added to or removed from a virtual cluster. In an embodiment, WCCP notifies each node in a WCCP service group whenever a new node joins or an existing node leaves the service group. A new blade may take over master responsibility from an existing master blade if the new blade joins and becomes the designated node, or the existing master blade fails or otherwise leaves the virtual node. A master node writes assignment information for the virtual node to the MDS Registry (FIG. 5). The new master reads this information to determine the latest state of the previous master. For each assignment, the new master sends a Source Token or Destination Token message to the appropriate blade in case the previous master did not get a chance to do so. If a slave blade receives a duplicate Source Token or Destination Token message, the slave blade ignores the message.

If a change is detected at step 446, then control returns to step 402 to retrieve the new WCCP configuration and determine the processor's role. If no change occurred, then control returns to step 432 to consume the next message of the assigned data source.

FIG. 5 is a message ladder diagram showing interaction of a master processor and slave processor for message consumption. In an embodiment, messaging logic 120 (FIG. 2) may comprise WCCP logic 502 for implementing WCCP. A master processor 408 may comprise a message delivery semantics (MDS) manager 504. A slave processor may comprise a MDS manager 506, MDS registry 508, message handler 510, and assigned data source 130. MDS managers determine which data source should be consumed and when consumption should occur. MDS registry 508 stores assignment information that shared between all blades or processors in virtual cluster 116. The MDS Registry 508 interfaces with an underlying persistent storage mechanism such as a database. MDS Managers 504, 506 read and write to the MDS Registry 508 as needed, but only one reader or writer of MDS Registry 508 data is active at any point in time.

The preceding elements interact using messages that are illustrated using arrows in FIG. 5. Steps of FIG. 4 may be implemented using one or more messages for each step. For example, assignment distribution at step 416 may comprise MDS manager 504 of master processor 408 sending a message to MDS manager 506 of slave processor 406, causing the MDS manager of the slave processor to send an assignment message 512 to the message handler 510.

The sequence numbers maintain proper ordering of messages within a group. Whenever a slave processor consumes a message, the slave processor obtains a group sequence number to assign to the message from the MDS Manager. The MDS Manager checks the Consumption entries in the MDS Registry to determine if the message has already been assigned a group sequence number. If so, the MDS Manager returns the current group sequence number. If not, the MDS Manager increments the next group sequence number, updates the Next Group Sequence Number attribute of the appropriate Source Entry in the MDS Registry, creates a new Consumption entry, and returns the group sequence number.

Thus, in an embodiment, assigning a sequence number at step 436 may comprise message handler 510 sending a "get sequence number" message 514 to MDS manager 506. In response the MDS manager 506 sends a request 516 for the sequence number to MDS registry 508 and receives a response 518. The MDS manager 506 then sends the sequence number to the message handler 510 with message 520.

Yielding a data source at step 442 may comprise message handler 510 sending a first yield message 522 to MDS manager 506, and the MDS manager 506 sending a second yield message 524 to MDS manager 504 of the master processor 408.

3.3 Processing Outbound Messages

To process outbound messages, in an embodiment, the master blade coordinates with the slave blades to ensure that messages are delivered in order if required. Slave blades receive messages and determine when it is appropriate to deliver the message based on the sequence number assigned to the message, and the next sequence number associated with the destination of the message. The slave blades request exclusive access to the destination from the master blade, which assigns exclusive access to data destinations to one slave blade that has the message with the next delivery sequence.

When the slave blades receive exclusive access to destinations, the slave blades deliver as many messages as possible in order. After delivering each message, shared state among the blades is updated. Once the master blade receives a request from another blade that has the next message in sequence to be delivered, the master blade asks the current slave blade to relinquish access to the destination. Once the current slave blade relinquishes access to the destination, that slave blade no longer delivers messages to that destination until that slave blade re-acquires the Destination Token from the master blade. At this time, the master blade reassigns the Destination Token to the slave blade having the next application message in delivery sequence.

In one embodiment, the master blade persistently stores the assignment state in a database to ensure that another blade can take over should the master blade fail, and the master and slave blades communicate destination assignments by passing Destination Tokens to each other as control messages over TCP.

In an embodiment, The MDS Manager on the master blade assigns destinations by updating the Producer attribute of the appropriate Destination entry in the MDS Registry and then sending the appropriate Destination Token to the blade. If a blade receives a Destination Token, it can be assured that no other blade can deliver messages to the data destination referenced in the Destination Token.

Upon receiving a Destination Token message, each blade delivers all registered messages that are ready to be delivered to the destination. A next sequence number is assigned to each destination to coordinate ordering as the messages are delivered from each blade. In one embodiment, each blade persists the next sequence number that should be delivered to the destination in a database to allow the blades to coordinate ordered delivery of messages.

In an embodiment, the MDS Manager on each blade adds a Delivery entry in the MDS Registry for each message that arrives on that blade and completes flow processing. The MDS Manager on the master blade assigns a destination to any blade which requests it, or has added a delivery sequence number equal to the Next Delivery Sequence Number attribute of a Destination entry in the MDS Registry. As blades deliver messages to the destination, the appropriate Delivery entry is removed from the MDS Registry.

When a message is received on a slave blade out of order, delivery processing for the message varies depending on the reliability semantics associated with the message. If the message has a sequence number less than the next sequence number of the destination, then the message has already been delivered or skipped and so it can be dropped. If the message has a sequence number greater than the next sequence number of the destination, then the destination is not yet ready for the message. The slave blade informs the master blade that the slave blade has a particular message to deliver. The master blade assigns the Destination Token to that slave blade when the particular message is ready to be delivered in sequence.

If flow processing on a blade redirects a message to a different destination than other messages within the same group, then the message does not need to await delivery of all messages below its group sequence number. Instead, the message can be delivered as soon as it is determined that all messages below its group sequence number are directed to a different destination. The MDS Manager on each blade maintains a separate Delivery entry for the different destinations and assigns the Next Delivery Sequence Number attribute as messages with lower group sequence numbers complete flow processing and are determined to be directed to different destinations.

Whenever a message arrives, the MDS Manager on each blade checks the delivery policy of the message to determine how to handle delivery. If the delivery policy indicates the message is ordered, the MDS Manager also checks if the message is reliable and then read from the Next Delivery Sequence Number attribute of the appropriate Destination Entry in the MDS Registry.

TABLE 1

Destination Delivery

| Ordered | Reliable | Next Delivery Sequence Number | Action |
|---------|----------|-------------------------------|--------|
| No | N/A | N/A | Deliver immediately. |
| Yes | No | =Current Delivery Sequence Number | Request token then deliver. |
| | | <Current Delivery Sequence Number | Wait for timeout, request token then deliver. |
| | | >Current Delivery Sequence Number | Drop. |
| | Yes | =Current Delivery Sequence Number | Request token then deliver. |
| | | <Current Delivery Sequence Number | Wait for token then deliver. |
| | | >Current Delivery Sequence Number | Drop. |

To request the Destination Token, the MDS Manager sends a Destination Request message to the master blade. The master blade then waits for the corresponding Destination Token, if another blade has it, updates the appropriate Destination Entry in the MDS Registry to indicate which blade holds the token, and sends the Destination Token to the requesting blade.

Figure 6:
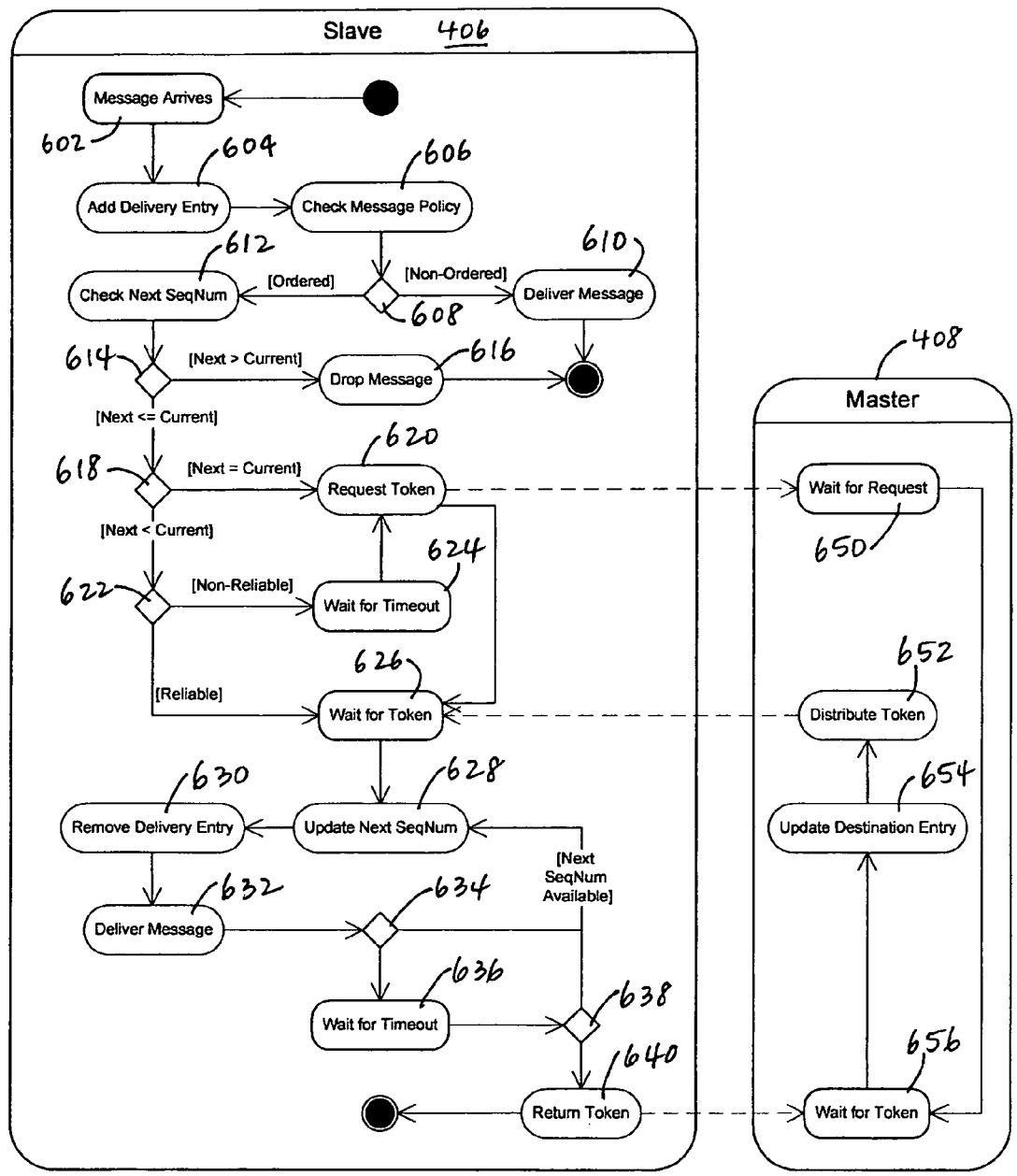
FIG. 6 is a flow diagram showing ordered message processing in a slave processor.

FIG. 6 is a flow diagram showing ordered message processing in a slave processor. In an embodiment, processing message delivery in a slave processor 406 begins at step 602 in which a message arrives for delivery. In step 604, the slave processor 406 adds a delivery entry to the registry, and in step 606 the slave processor 406 retrieves a message delivery policy value from within the message or from the registry. At step 608 the slave processor 406 tests whether the message is an ordered or non-ordered message. If the message is non-ordered, then the slave processor 406 delivers the message at step 610 and processing is then complete.

If the message is ordered, then in step 612 the slave processor 406 determines the next sequence number expected for a message to be delivered. The next sequence number is compared to the current sequence number of the current message in steps 614, 618. If the next sequence number is larger than the current sequence number, then the message is dropped at step 616.

If the next sequence number is equal to the current sequence number, then at step 620 the slave processor 406 requests a delivery token from the master processor 408, and then proceeds to step 626 to wait for the token. The delivery token request of step 620 includes a sequence number for the message to be delivered. Based on evaluating the sequence number, master processor 408 can determine whether to provide a token after awaiting a timeout, or can immediately grant the delivery token if the current message delivery policy indicates reliable message delivery, that is, that out-of-order message delivery is permitted to ensure reliability.

If the next sequence number is less than the current sequence number, then in step 622 the slave processor 406 tests whether the message policy requests reliable or non-reliable message delivery. If non-reliable delivery is requested, then in step 624 a wait stage occurs until expiration of a timeout value, to allow other ordered messages to arrive, and then control passes to step 620 in which a delivery token is requested. If reliable delivery is requested, then control passes to step 626 to wait for a delivery token.

When the slave processor 406 receives a delivery token for the destination of the message, then in step 628 the next sequence number value is updated to reflect delivery of the current message. At step 630 the delivery entry is removed, and in step 632 the message is delivered.

Steps 634, 634, and 638 reflect logic for obtaining a next sequence number and using a timeout to await the availability of the next sequence number. At step 640, the delivery token is returned to the slave processor.

Steps 650-656 show processing at the master processor 408 during delivery of messages. At step 650, the master processor waits for a delivery token to be requested. Upon receiving a request for a delivery token, at step 656 the master processor waits for another slave processor holding the delivery token to return the token. When the token is returned, the destination entry in the registry is updated at step 654 to indicate the new slave processor that holds the received delivery token. At step 652 the token is distributed to the requesting slave processor.

Figure 7:
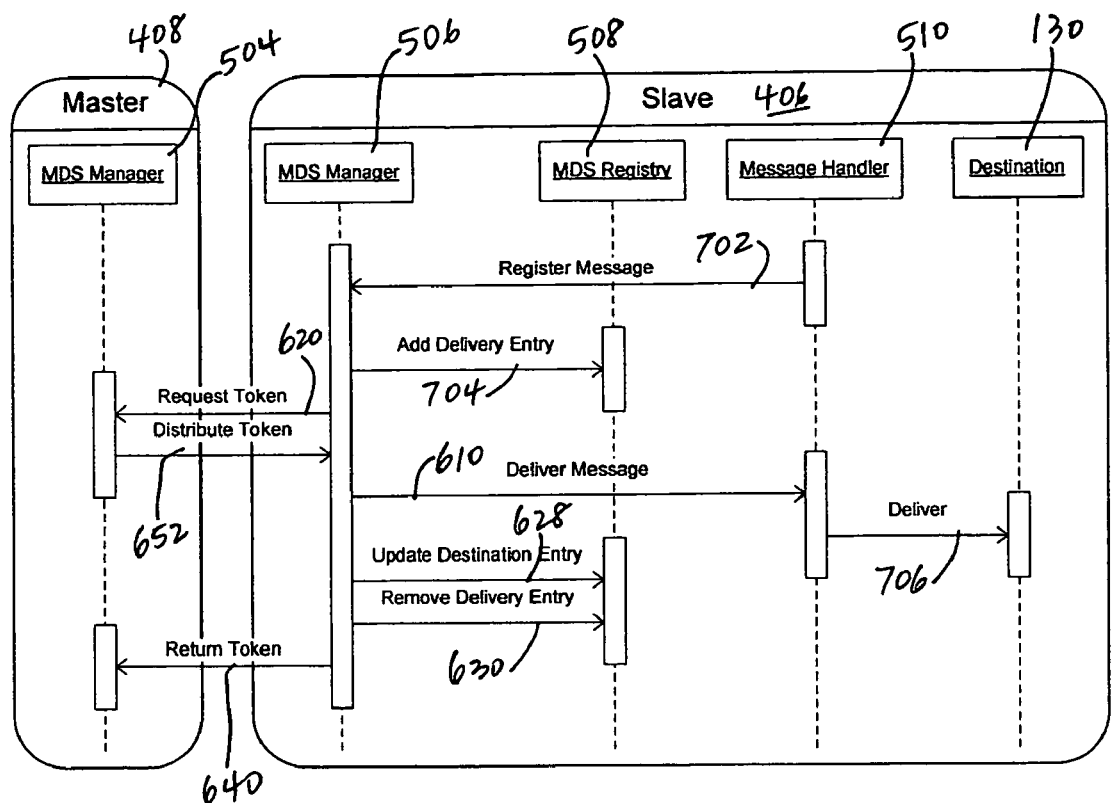
FIG. 7 is a message ladder diagram showing interaction of a master processor and slave processor for message delivery according to another embodiment.

FIG. 7 is a message ladder diagram showing interaction of a master processor and slave processor for message delivery. In an embodiment, a message received at step 602 (FIG. 6) arrives at message handler 510 and causes the message handler to send a register message 702 to MDS manager 506, which adds a delivery entry to the registry 508 using message 704. Message delivery at step 610 may comprise MDS manager 506 sending a deliver control message to message handler 510, which delivers the message to the destination 130 using control message 706.

In the course of delivery processing as described above, a message may transition among a Registered state, Pending state, and Delivered state. A message has the Registered state when the message is registered for delivery with message 702. When the message is ready for delivery as the next message for a destination, the message has the Pending state. If delivery is committed, then the message has the Delivered state. A message can roll back from the Pending to the Registered state if delivery cannot be committed.

3.4 Initialization

Initialization occurs when the blades in a virtual node first start up. The master blade assigns the configured data sources to each blade (including itself), persists the assignment information, and sends Source Token messages to each blade containing all of the data sources assigned to that blade.

3.5 Load Balancing and Rebalancing

Load balancing may be performed when more blades than data sources are present in a system, or if message processing for some data sources is computationally expensive relative to the other data sources.

In one embodiment, the master blade maintains a list of all blades in the virtual node ordered by the address of each blade. Each blade periodically yields its data sources and returns the corresponding Source Token for each data source to the master blade. The master blade assigns the data source to an appropriate blade in the list, updates the state information in the registry, and sends the Source Token to the blade. Alternate selection algorithms may be employed to select and assign the appropriate next blade depending on the workload characteristics, quality of service guarantees, or other criteria.

Rebalancing may occur when one or more blades join the virtual cluster. New blades joining a virtual cluster may occur in response to an automatic restart of a failed blade, or by an administrator adding a blade to the virtual node. In one embodiment, WCCP notifies each node in a WCCP service group whenever a new node joins the service group. The master blade inserts the new blade in the list of blades. As the other blades yield data sources, the master blade reassigns the data sources to the new blade until the new blade is assigned an equal number of data sources as the other blades.

The master blade may also preemptively request that certain blades yield certain sources to ensure an even distribution of source assignments. Some sources are required for proper functioning of a processor. For example, before sending a message to a server, a queue-based slave processor requires at least one reply-to queue source on which replies from the server can be deposited. Such sources are known as "sticky," and slave processors do not yield control of such sources at regular intervals as described above. Instead, the MDS Manager requests a slave processor to yield such sources as necessary. If a slave processor has more "sticky" sources than it needs, the slave processor yields a particular source when requested. If the slave processor has only the minimum number of "sticky" sources that the slave processor needs, the slave processor denies the yield request. The master blade then uses the load balancing approach described above to perform subsequent data source assignments.

3.6 Failover

Figure 8:
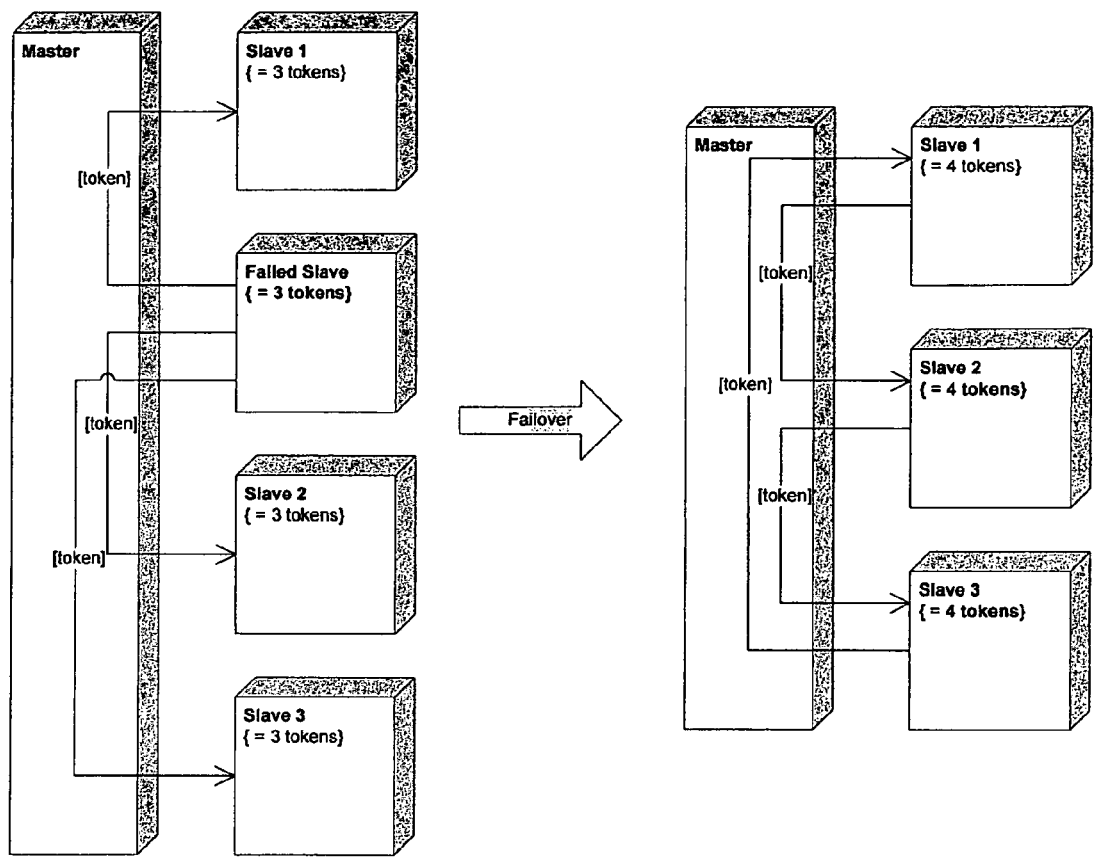
FIG. 8 is a block diagram showing a failover approach in another embodiment.

Failover occurs when one or more blades leave the virtual node. This may be triggered by a software or hardware failure on a blade, or by an administrator removing a blade from the virtual node. In one embodiment, WCCP notifies each node in a WCCP service group whenever a new node leaves the service group. The master blade reassigns the data sources from the failed or removed blades to the remaining blades using an appropriate load balancing algorithm. FIG. 8 is a block diagram showing a failover approach in an embodiment.

3.7 Registry Schema and Control Messages

In an embodiment, a storage schema of MDS registry 508 may comprise Source Entries, Consumption Entries, Destination Entries, Delivery Entries, and Duplicate Detection Entries.

A Source Entry represents the persistent shared state of a data source. This entry is created by the MDS Manager on the master blade for each data source that is registered. This entry is updated whenever a new blade is assigned to the data source and/or whenever a new message is consumed. This entry is removed whenever the corresponding data source is deregistered.

TABLE 2

Source Entry

| Attribute | Data Type | Description |
|---|---|---|
| Consumer | InetAddress | IP address of the blade that is currently consuming messages from this data source. |
| Group ID | String (key) | The group ID that uniquely identifies the data source. |
| Next Group Sequence Number | Long | The group sequence number to associate with the next message consumed from this data source. |
| Source Group ID | String | The source group ID of the data source. |

A Consumption Entry represents the persistent shared state of a consumed message. This entry is created by the MDS Manager on a blade as it consumes the message. This entry is removed when the delivery group to which the message belongs is committed to the destination by AONS.

TABLE 3

Consumption Entry

| Attribute | Data Type | Description |
|---|---|---|
| Group Sequence Number | Long | The group sequence number associated with the message consumed from this data source. |
| Message ID | String (key) | The unique identifier for the message assigned by the data source. If the data source does not assign a message ID, then this is the same as the AONS Message ID. |
| AONS Message ID | String | A unique identifier for the message assigned by AONS. |

A Destination Entry represents the persistent shared state of a destination for a particular group. This entry is created by the MDS Manager on the master blade for each destination to which messages from a particular group are being delivered. This entry is updated whenever a new blade is assigned to the destination for a particular group and/or whenever a message is delivered. This entry is never removed.

TABLE 4

Destination Entry

| Attribute | Data Type | Description |
|---|---|---|
| Delivery Group ID | String (key) | The delivery group ID that uniquely identifies the destination for a particular group. |
| Next Delivery Sequence Number | Long | The delivery sequence number of the next message to be delivered to this destination. |
| Producer | InetAddress | IP address of the blade that is currently delivering messages to this destination. |

A Delivery Entry represents the persistent shared state of a message to be delivered. This entry is created by the MDS Manager on a blade as it prepares to deliver a message. This entry is updated whenever the Delivery Sequence Number is known. This entry is removed by an asynchronous cleanup process when the TTL of the message has expired.

TABLE 5

Delivery Entry

| Attribute | Data Type | Description |
|---|---|---|
| Delivery Group ID | String | The delivery group ID that uniquely identifies the destination for a particular group. |
| Delivery Sequence Number | Long | The delivery sequence number associated with the message received on this blade. |
| Group ID | String (key) | The group ID that uniquely identifies the data source. |
| Group Sequence Number | Long (key) | The group sequence number of the message received on this blade. |
| Producer | InetAddress | IP address of the blade that has received the message with this sequence number. |

A Duplicate Detection Entry represents the transient shared state of message delivery. This entry is created by the MDS Manager on a blade as it delivers a message. This entry is updated when the message is committed. This entry is removed when an acknowledgement receipt is received.

TABLE 6

Duplicate Detection Entry

| Attribute | Data Type | Description |
|---|---|---|
| Destination | URI | The destination URI. |
| Message ID | String (key) | The identifier for the message consumed from, unique to, and assigned by this data source. |
| Delivery State | Enumeration | The delivery state of the message. Can be DELIVERED, NOT_SEEN, or PENDING. |

In an embodiment, the functional elements described herein may communicate with control messages including Source Token Messages, Destination Token Messages, and Destination Request Messages. A Source Token Message is sent by the master blade to a slave blade to indicate exclusive access to consume messages from the source.

TABLE 7

Source Token Message

| Attribute | Data Type | Description |
|---|---|---|
| Group ID | String (key) | The group ID of the messages for this source. |

A Destination Token Message is sent by the master blade to a slave blade to indicate exclusive access to deliver messages with a particular group ID to the destination.

TABLE 8

Destination Token Message

| Attribute | Data Type | Description |
|---|---|---|
| Delivery Group ID | String (key) | The delivery group ID that uniquely identifies the destination for a particular group. |

A Destination Request Message is sent by a slave blade to the master blade to request a Destination Token.

TABLE 9

Destination Request Message

| Attribute | Data Type | Description |
| --- | --- | --- |
| Delivery Group ID | String (key) | The delivery group ID that uniquely identifies the destination for a particular group. |
| Producer | InetAddress | IP address of the blade that is requesting the token for this destination. |

The MDS Registry 508 also may store Service Group Entries that specify WCCP group membership of processors, as follows:

| Attribute | Data Type | Description |
| --- | --- | --- |
| Service Group ID | Integer | A unique identifier for the service group. |
| Designated Node | InetAddress | The member of the service group that corresponding to the WCCP designated node. |
| Member Nodes | List<InetAddress> | All of the members of the service group. |

4.0 Implementation Mechanisms

Hardware Overview

Figure 9:
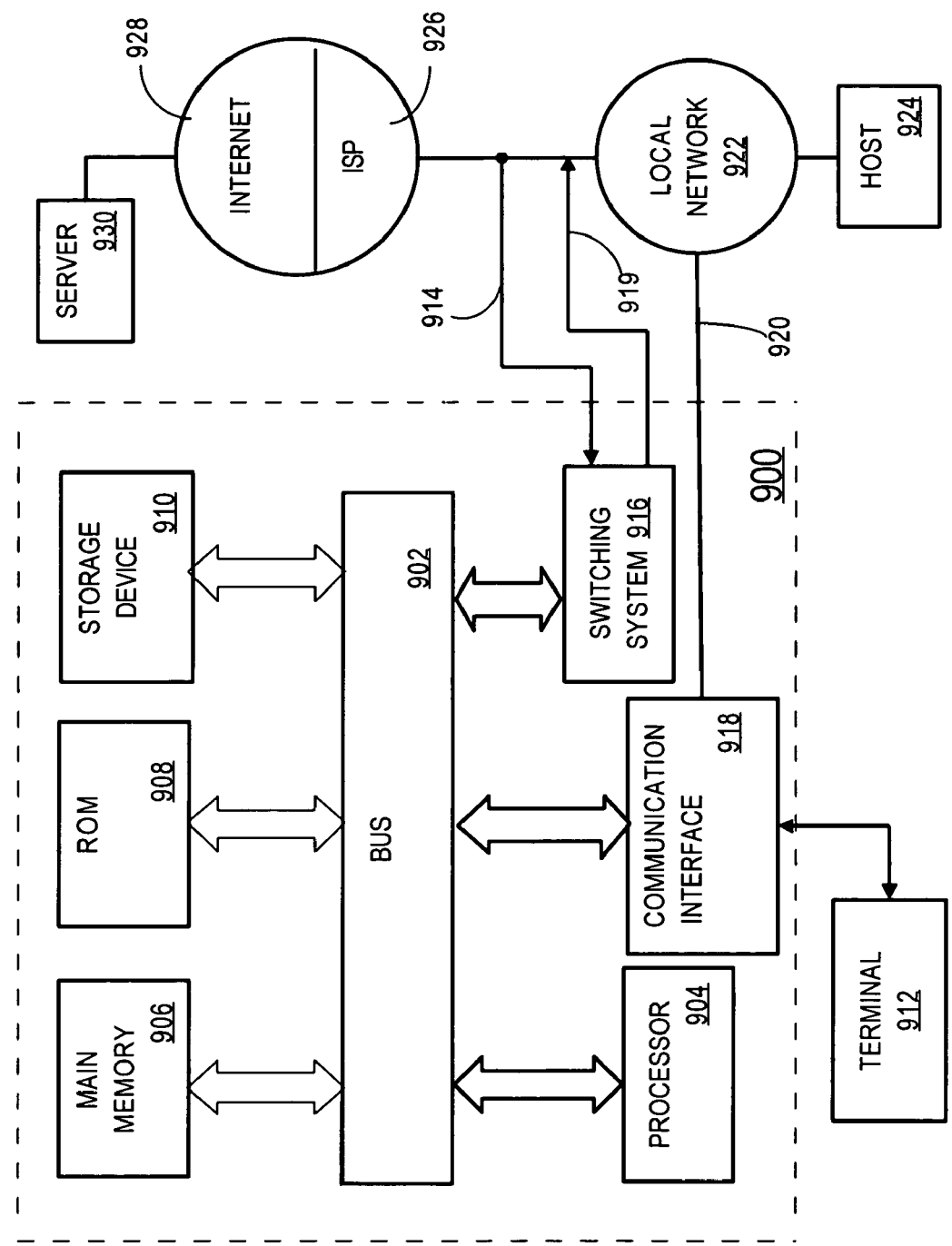
FIG. 9 is a block diagram of a computer system that can be used to implement an embodiment.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for performing ordered application message delivery in a network element. According to one embodiment of the invention, performing ordered application message delivery in a network element is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for performing ordered application message delivery in a network element as described herein.

The received code may be executed by processor 904 as it is received, and/or stored in storage device 910, or other non-volatile storage for later execution. In this manner, computer system 900 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing apparatus, comprising:
    a plurality of processors;
    message processing logic which when executed by one or more of the processors is operable to perform:
        establishing one of the processors as a master processor and all other processors as slave processors, wherein the establishing one of the processors as a master processor and all other processors as slave processors is performed using Web Cache Control Protocol (WCCP);
        receiving an application message from a particular message source among a plurality of message sources coupled to one or more network interfaces and the processors, wherein the application message comprises one or more data frames, packets and segments;
        granting exclusive control of the particular message source to a selected one of the slave processors;
        assigning an ordered sequence number to the application message;
        granting exclusive control, for a particular message destination among a plurality of message destinations coupled to the network interfaces and the processors, to the selected one of the slave processors; and
        providing the application message to the particular message destination.

2. An apparatus as recited in claim 1, wherein the selected one of the slave processors yields exclusive control of the particular message source to the master processor after processing a specified plurality of messages.

3. An apparatus as recited in claim 1, wherein the selected one of the slave processors yields exclusive control of the particular message source to the master processor after processing a specified time period.

4. An apparatus as recited in claim 1, wherein the message processing logic further comprises logic which when executed by the processors is operable to perform:
    persistently storing information identifying the assigned ordered sequence number of the application message;
    determining that the selected one of the slave processors has failed;
    selecting a different one of the slave processors;
    granting exclusive control of the particular message source to the selected different one of the slave processors;
    retrieving, at the selected different one of the slave processors, the stored information identifying the assigned ordered sequence number of the application message;
    receiving a new application message;
    assigning a new sequence number to the new application message by increasing the assigned ordered sequence number that was retrieved.

5. An apparatus as recited in claim 1, wherein the message processing logic further comprises logic which when executed by the processors is operable to perform:
    persistently storing information identifying which selected one of the slave processors has been granted exclusive control of the particular message source;
    determining that the master processor has failed;
    establishing a different one of the processors as a new master processor;
    retrieving, at the new master processor, the stored information identifying which selected one of the slave processors has been granted exclusive control of the particular message source.

6. An apparatus as recited in claim 1, wherein the message processing logic further comprises logic which when executed by the processors is operable to perform:
    receiving the application message and its sequence number from the selected one of the slave processors;
    determining whether the sequence number is next in order after a previous sequence number of a previously sent message;
    providing the application message to the particular message destination only when the sequence number is ordered sequentially after a previous sequence number of a previously sent message.

7. An apparatus as recited in claim 1, wherein the message processing logic further comprises logic which when executed by the processors is operable to perform, at the master processor:
    receiving a first application message and a first sequence number from a first one of the slave processors that has processed messages for a particular message source;
    receiving a second application message and a second sequence number from a second one of the slave processors that has processed messages for the same particular message source;
    determining whether the first sequence number is next in order after a previous sequence number of a previously sent message;
    providing the first application message to the particular message destination if the first sequence number is next in order after the previous sequence number of the previously sent message, and otherwise:
        determining whether the second sequence number is next in order after the previous sequence number of the previously sent message;
        providing the second application message to the particular message destination when the second sequence number is next in order after the previous sequence number of the previously sent message.

8. An apparatus as recited in claim 1, wherein the message processing logic further comprises logic which when executed by the processors is operable to perform, at the master processor:
receiving a first request for exclusive access to the particular message destination, a first application message and a first sequence number from a first one of the slave processors that has processed messages for a particular message source;
receiving a second request for exclusive access to the particular message destination, a second application message and a second sequence number from a second one of the slave processors that has processed messages for the same particular message source;
determining whether the first sequence number is next in order after a previous sequence number of a previously sent message;
granting exclusive control of the particular message destination to the first one of the slave processors only when the first sequence number is next in order after a previous sequence number of a previously sent message.

9. An apparatus as recited in claim 1, wherein the message processing logic further comprises logic which when executed by the processors is operable to perform:
in response to providing the application message to the particular message destination, persistently storing information identifying the assigned ordered sequence number of the application message in association with information identifying the particular message destination;
receiving a request for exclusive access to the particular message destination, a new application message and its sequence number from the selected one of the slave processors;
retrieving the persistently stored information identifying the assigned ordered sequence number of the application message for the particular message destination;
determining whether the sequence number is next in order after the retrieved sequence number;
providing the application message to the particular message destination only when the sequence number is next in order after the retrieved sequence number.

10. An apparatus as recited in claim 1, comprising any of a router for a packet data network and a switch for a packet data network.

11. An apparatus as recited in claim 1, comprising a switching system coupled to the processors and comprising packet forwarding logic, wherein the switching system and packet forwarding logic are configured to receive packets on a first network interface, determine a second network interface on which to send the packets, and to send the packets on the second network interface.

12. An apparatus as recited in claim 1, wherein the application message is of OSI Layer 4, 5, or 6 and comprises one or more data frames, packets and segments of OSI Layer 1, 2 and 3.

13. A data processing apparatus, comprising:
a plurality of processors;
means for establishing one of the processors as a master processor and all other processors as slave processors, wherein the means for establishing one of the processors as a master processor and all other processors as slave processors comprises Web Cache Control Protocol (WCCP);
means for receiving an application message from a particular message source among a plurality of message sources coupled to one or more network interfaces and the processors, wherein the application message comprises one or more data frames, packets and segments;
means for granting exclusive control of the particular message source to a selected one of the slave processors;
means for assigning an ordered sequence number to the application message;
means for granting exclusive control, for a particular message destination among a plurality of message destinations coupled to the network interfaces and the processors, to the selected one of the slave processors; and
means for providing the application message to the particular message destination.

14. An apparatus as recited in claim 13, comprising means for the selected one of the slave processors to yield exclusive control of the particular message source to the master processor after processing a specified plurality of messages.

15. An apparatus as recited in claim 13, wherein comprising means for the selected one of the slave processors to yield exclusive control of the particular message source to the master processor after processing a specified time period.

16. An apparatus as recited in claim 13, further comprising:
means for persistently storing information identifying the assigned ordered sequence number of the application message;
means for determining that the selected one of the slave processors has failed;
means for selecting a different one of the slave processors;
means for granting exclusive control of the particular message source to the selected different one of the slave processors;
means for retrieving, at the selected different one of the slave processors, the stored information identifying the assigned ordered sequence number of the application message;
means for receiving a new application message;
means for assigning a new sequence number to the new application message by increasing the assigned ordered sequence number that was retrieved.

17. An apparatus as recited in claim 13, further comprising:
means for persistently storing information identifying which selected one of the slave processors has been granted exclusive control of the particular message source;
means for determining that the master processor has failed;
means for establishing a different one of the processors as a new master processor;
means for retrieving, at the new master processor, the stored information identifying which selected one of the slave processors has been granted exclusive control of the particular message source.

18. An apparatus as recited in claim 13, further comprising:
means for receiving the application message and its sequence number from the selected one of the slave processors;
means for determining whether the sequence number is next in order after a previous sequence number of a previously sent message;
means for providing the application message to the particular message destination only when the sequence number is ordered sequentially after a previous sequence number of a previously sent message.

19. An apparatus as recited in claim 13, further comprising:
means for receiving a first application message and a first sequence number from a first one of the slave processors that has processed messages for a particular message source;
means for receiving a second application message and a second sequence number from a second one of the slave processors that has processed messages for the same particular message source;
means for determining whether the first sequence number is next in order after a previous sequence number of a previously sent message;
means for providing the first application message to the particular message destination if the first sequence number is next in order after the previous sequence number of the previously sent message;
means for determining whether the second sequence number is next in order after the previous sequence number of the previously sent message and for providing the second application message to the particular message destination when the second sequence number is next in order after the previous sequence number of the previously sent message.

20. An apparatus as recited in claim 13, further comprising:
means for receiving a first request for exclusive access to the particular message destination, a first application message and a first sequence number from a first one of the slave processors that has processed messages for a particular message source;
means for receiving a second request for exclusive access to the particular message destination, a second application message and a second sequence number from a second one of the slave processors that has processed messages for the same particular message source;
means for determining whether the first sequence number is next in order after a previous sequence number of a previously sent message;
means for granting exclusive control of the particular message destination to the first one of the slave processors only when the first sequence number is next in order after a previous sequence number of a previously sent message.

21. An apparatus as recited in claim 13, further comprising:
means for persistently storing information identifying the assigned ordered sequence number of the application message in association with information identifying the particular message destination in response to providing the application message to the particular message destination;
means for receiving a request for exclusive access to the particular message destination, a new application message and its sequence number from the selected one of the slave processors;
means for retrieving the persistently stored information identifying the assigned ordered sequence number of the application message for the particular message destination;
means for determining whether the sequence number is next in order after the retrieved sequence number;
means for providing the application message to the particular message destination only when the sequence number is next in order after the retrieved sequence number.

22. An apparatus as recited in claim 13, comprising any of a router for a packet data network and a switch for a packet data network.

23. An apparatus as recited in claim 13, comprising a switching system coupled to the processors and comprising packet forwarding logic, wherein the switching system and packet forwarding logic are configured to receive packets on a first network interface, determine a second network interface on which to send the packets, and to send the packets on the second network interface.

24. An apparatus as recited in claim 13, wherein the application message is of OSI Layer 4, 5, or 6 and comprises one or more data frames, packets and segments of OSI Layer 1, 2 and 3.

25. A computer-implemented method, comprising:
establishing one of a plurality of processors as a master processor and all other processors as slave processors, wherein the establishing of one of the processors as a master processor and all other processors as slave processors is performed using Web Cache Control Protocol (WCCP);
receiving an application message from a particular message source among a plurality of message sources coupled to one or more network interfaces and the processors, wherein the application message comprises one or more data frames, packets and segments;
granting exclusive control of the particular message source to a selected one of the slave processors;
assigning an ordered sequence number to the application message;
granting exclusive control, for a particular message destination among a plurality of message destinations coupled to the network interfaces and the processors, to the selected one of the slave processors; and
providing the application message to the particular message destination.

26. A method as recited in claim 25, wherein the selected one of the slave processors yields exclusive control of the particular message source to the master processor after processing a specified plurality of messages.

27. A method as recited in claim 25, wherein the selected one of the slave processors yields exclusive control of the particular message source to the master processor after processing a specified time period.

28. A method as recited in claim 25, further comprising:
persistently storing information identifying the assigned ordered sequence number of the application message;
determining that the selected one of the slave processors has failed;
selecting a different one of the slave processors;
granting exclusive control of the particular message source to the selected different one of the slave processors;
retrieving, at the selected different one of the slave processors, the stored information identifying the assigned ordered sequence number of the application message;
receiving a new application message;
assigning a new sequence number to the new application message by increasing the assigned ordered sequence number that was retrieved.

29. A method as recited in claim 25, further comprising:
persistently storing information identifying which selected one of the slave processors has been granted exclusive control of the particular message source;
determining that the master processor has failed;
establishing a different one of the processors as a new master processor;
retrieving, at the new master processor, the stored information identifying which selected one of the slave processors has been granted exclusive control of the particular message source.

30. A method as recited in claim 25, further comprising:
receiving the application message and its sequence number from the selected one of the slave processors;
determining whether the sequence number is next in order after a previous sequence number of a previously sent message;
providing the application message to the particular message destination only when the sequence number is ordered sequentially after a previous sequence number of a previously sent message.

31. A method as recited in claim 25, further comprising:
receiving a first application message and a first sequence number from a first one of the slave processors that has processed messages for a particular message source;
receiving a second application message and a second sequence number from a second one of the slave processors that has processed messages for the same particular message source;
determining whether the first sequence number is next in order after a previous sequence number of a previously sent message;
providing the first application message to the particular message destination if the first sequence number is next in order after the previous sequence number of the previously sent message, and otherwise:
 determining whether the second sequence number is next in order after the previous sequence number of the previously sent message;
 providing the second application message to the particular message destination when the second sequence number is next in order after the previous sequence number of the previously sent message.

32. A method as recited in claim 25, further comprising:
receiving a first request for exclusive access to the particular message destination, a first application message and a first sequence number from a first one of the slave processors that has processed messages for a particular message source;
receiving a second request for exclusive access to the particular message destination, a second application message and a second sequence number from a second one of the slave processors that has processed messages for the same particular message source;
determining whether the first sequence number is next in order after a previous sequence number of a previously sent message;
granting exclusive control of the particular message destination to the first one of the slave processors only when the first sequence number is next in order after a previous sequence number of a previously sent message.

33. A method as recited in claim 25, further comprising:
in response to providing the application message to the particular message destination, persistently storing information identifying the assigned ordered sequence number of the application message in association with information identifying the particular message destination;
receiving a request for exclusive access to the particular message destination, a new application message and its sequence number from the selected one of the slave processors;
retrieving the persistently stored information identifying the assigned ordered sequence number of the application message for the particular message destination;
determining whether the sequence number is next in order after the retrieved sequence number;
providing the application message to the particular message destination only when the sequence number is next in order after the retrieved sequence number.

34. A method as recited in claim 25, wherein the computer implementing the method comprises any of a router for a packet data network and a switch for a packet data network.

35. A method as recited in claim 25, wherein the computer implementing the method comprises a switching system coupled to the processors and comprising packet forwarding logic, wherein the switching system and packet forwarding logic are configured to receive packets on a first network interface, determine a second network interface on which to send the packets, and to send the packets on the second network interface.

36. A method as recited in claim 25, wherein the application message is of OSI Layer 4, 5, or 6 and comprises one or more data frames, packets and segments of OSI Layer 1, 2 and 3.

* * * * *

UNITED STATES PATENT AND TRADEMARK OFFICE
CERTIFICATE OF CORRECTION

PATENT NO. : 7,606,867 B1  Page 1 of 1
APPLICATION NO. : 11/471465
DATED : October 20, 2009
INVENTOR(S) : Singhal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Twelfth Day of October, 2010

David J. Kappos
*Director of the United States Patent and Trademark Office*